US008031745B2

(12) United States Patent
Onggosanusi et al.

(10) Patent No.: US 8,031,745 B2
(45) Date of Patent: Oct. 4, 2011

(54) DOWNLINK SYNCHRONIZATION CHANNEL AND METHODS FOR CELLULAR SYSTEMS

(75) Inventors: Eko N. Onggosanusi, Allen, TX (US);
Anand G. Dabak, Plano, TX (US);
Badri N. Varadarajan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 252 days.

(21) Appl. No.: 11/737,554

(22) Filed: Apr. 19, 2007

(65) Prior Publication Data

US 2007/0248068 A1 Oct. 25, 2007

Related U.S. Application Data

(60) Provisional application No. 60/745,250, filed on Apr. 20, 2006, provisional application No. 60/828,846, filed on Oct. 10, 2006, provisional application No. 60/884,557, filed on Jan. 11, 2007, provisional application No. 60/891,067, filed on Feb. 22, 2007.

(51) Int. Cl.
*H04J 3/06* (2006.01)

(52) U.S. Cl. ........ 370/503; 370/208; 370/324; 370/337; 370/342; 370/347; 370/350

(58) Field of Classification Search ........... 370/338, 370/350, 329, 335, 336, 342, 431, 442, 321, 370/337, 347, 432, 509, 510, 511, 513, 512, 370/515, 520, 503, 320, 341, 208, 324; 455/448, 455/449, 502, 415, 422, 436–444; 375/145, 375/146, 149, 354, 356, 358, 362, 364, 365, 375/366, 368

See application file for complete search history.

(56) References Cited

U.S. PATENT DOCUMENTS

| 5,930,366 | A  | * | 7/1999  | Jamal et al.     | 370/509 |
|-----------|----|---|---------|------------------|---------|
| 6,363,060 | B1 | * | 3/2002  | Sarkar           | 370/342 |
| 6,385,264 | B1 | * | 5/2002  | Terasawa et al.  | 375/371 |
| 6,480,558 | B1 | * | 11/2002 | Ottosson et al.  | 375/350 |
| 6,717,930 | B1 | * | 4/2004  | Sezgin et al.    | 370/335 |
| 6,847,630 | B2 | * | 1/2005  | Blanz et al.     | 370/350 |
| 6,894,995 | B2 | * | 5/2005  | Chitrapu et al.  | 370/335 |
| 6,947,402 | B2 | * | 9/2005  | Sezgin et al.    | 370/335 |
| 7,102,994 | B2 | * | 9/2006  | Sezgin et al.    | 370/209 |
| 7,248,621 | B2 | * | 7/2007  | Rudolf           | 375/145 |
| 7,289,483 | B1 | * | 10/2007 | Lim              | 370/342 |
| 7,336,635 | B2 | * | 2/2008  | Giancola et al.  | 370/335 |
| 2002/0075833 | A1 | * | 6/2002 | Dick et al.     | 370/336 |

(Continued)

*Primary Examiner* — Olumide T Ajibade Akonai
(74) *Attorney, Agent, or Firm* — Ronald O. Neerings; Wade J. Brady, III; Frederick J. Telecky, Jr.

(57) ABSTRACT

The present invention provides a method of operating a base station transmitter. The method includes providing a cellular downlink synchronization signal having primary and secondary portions, wherein the primary portion employs a corresponding one of a plurality of different primary signals allocated to adjoining transmission cells. The method also includes further providing cell-specific information in the secondary portion and transmitting the cellular downlink synchronization signal. In one embodiment, the primary portion explicitly indicates a partial cell identification information and the remaining cell identification information is carried in the secondary portion. In another embodiment, the plurality of different primary signals are simply used to avoid the channel mismatch effect. The present invention also provides a method of operating user equipment. The method includes receiving a cellular downlink synchronization signal having primary and secondary portions wherein the timing acquisition is performed in conjunction with the primary synchronization sequence index detection via the primary portion. In addition, the secondary portion provides cell-specific parameters and identifying and extracting the secondary portion.

38 Claims, 6 Drawing Sheets

U.S. PATENT DOCUMENTS

| | | |
|---|---|---|
| 2003/0156574 A1* | 8/2003 | Raaf .............................. 370/350 |
| 2006/0114812 A1 | 6/2006 | Kim et al. |
| 2007/0133390 A1* | 6/2007 | Luo et al. ..................... 370/208 |
| 2007/0140106 A1* | 6/2007 | Tsai et al. ..................... 370/208 |
| 2007/0183391 A1* | 8/2007 | Akita et al. ................... 370/350 |
| 2008/0019350 A1* | 1/2008 | Onggosanusi et al. ....... 370/350 |

* cited by examiner

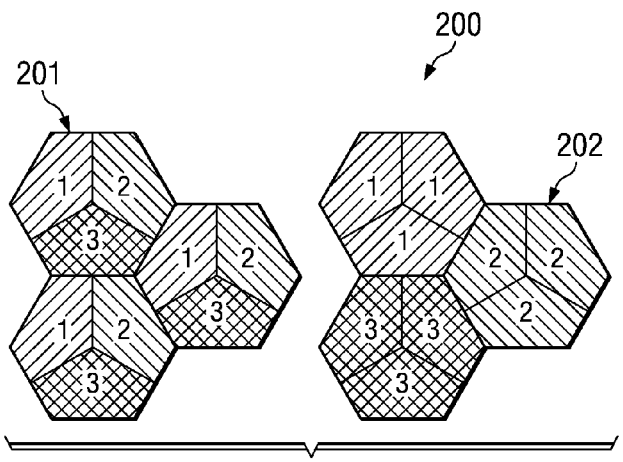
FIG. 2
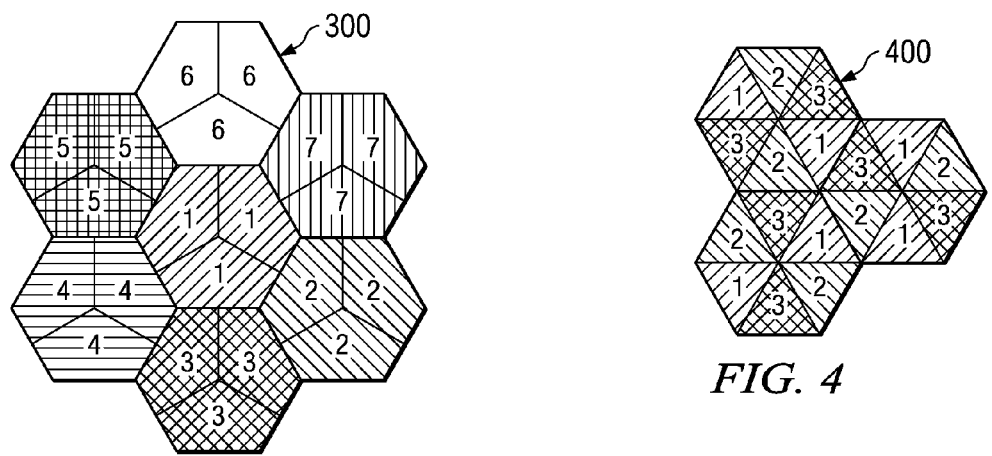
FIG. 3
FIG. 4
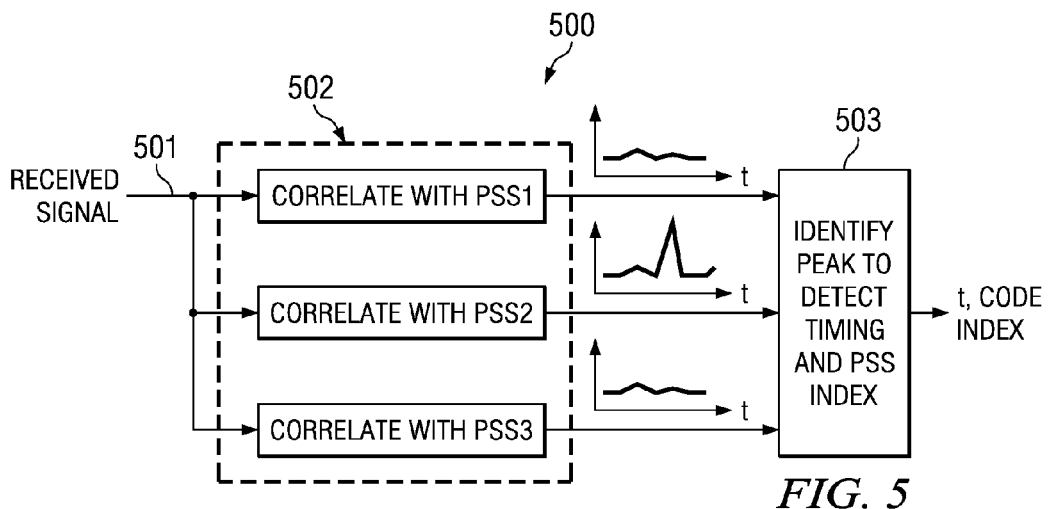
FIG. 5

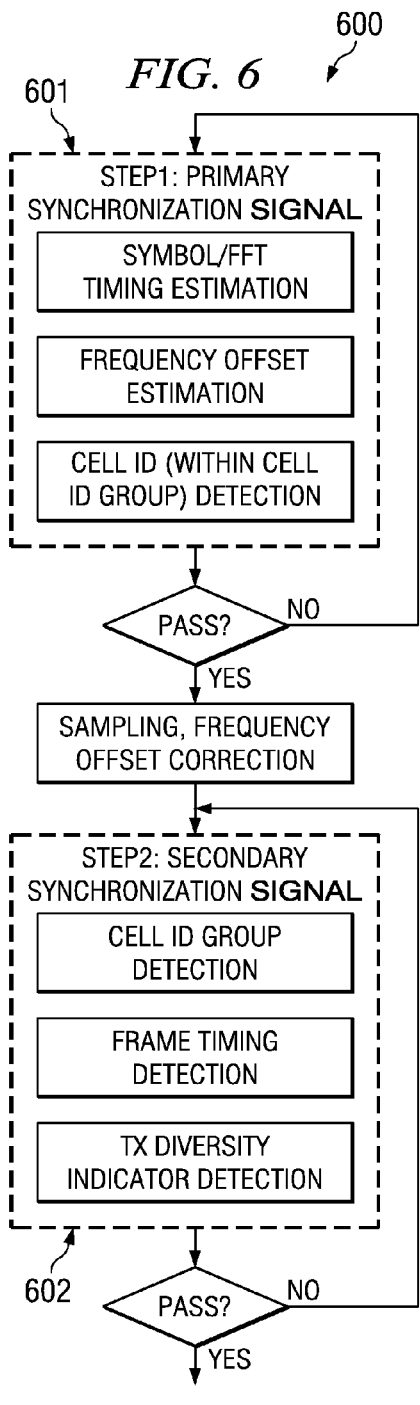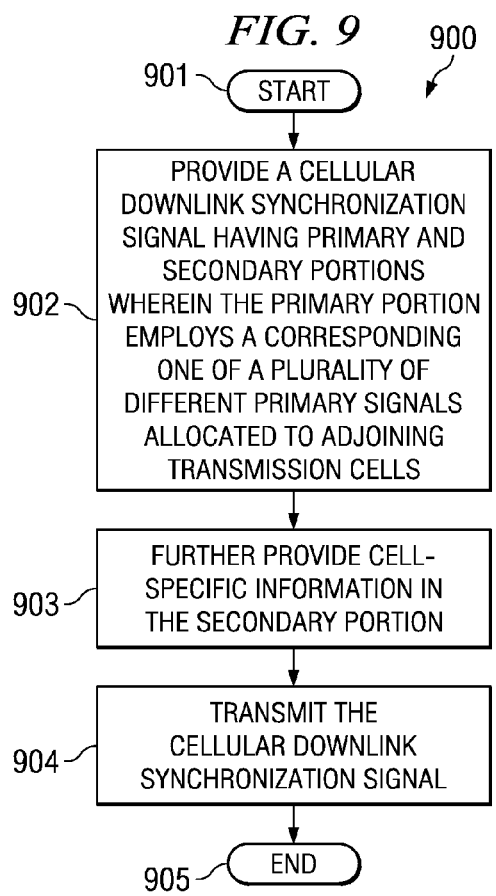

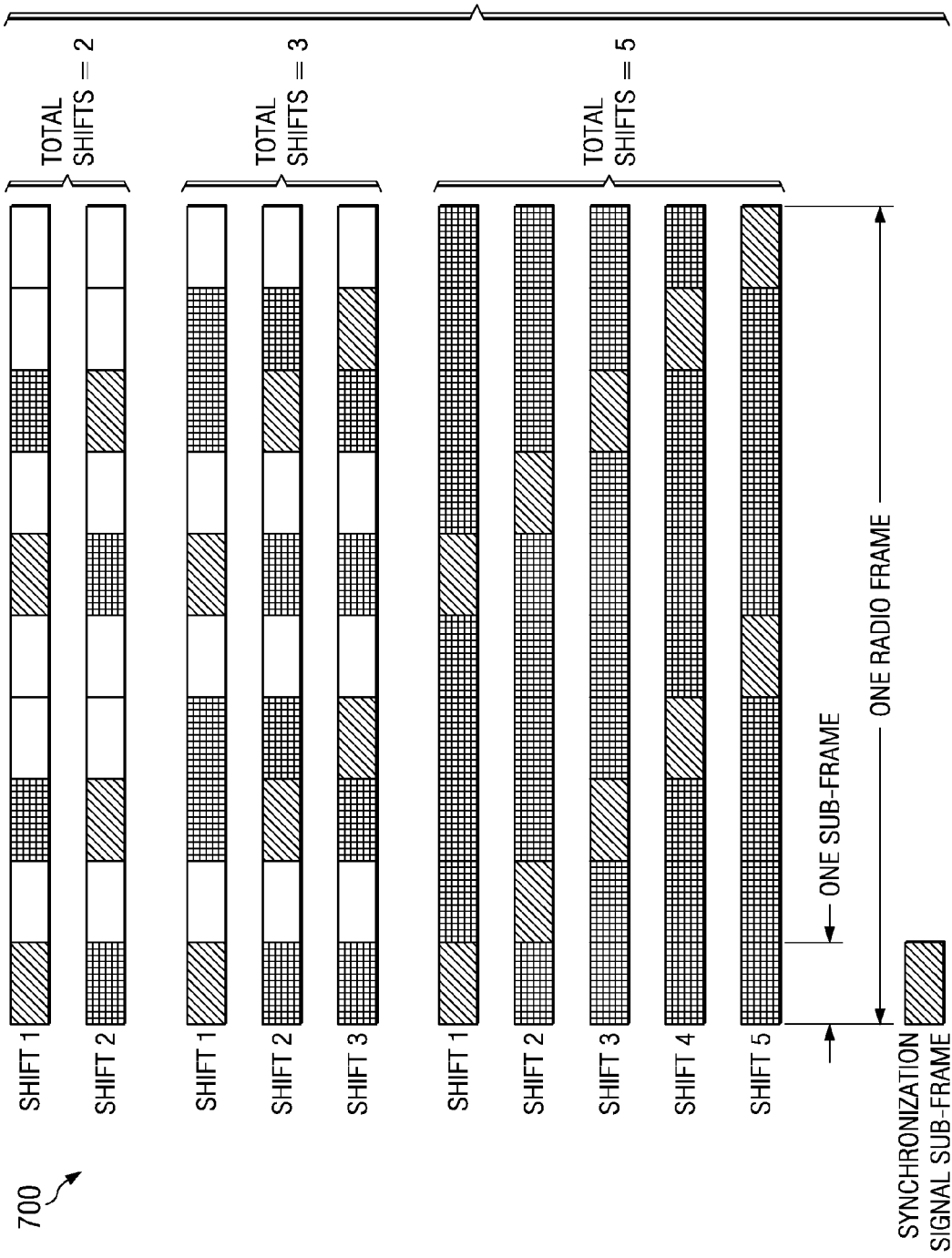

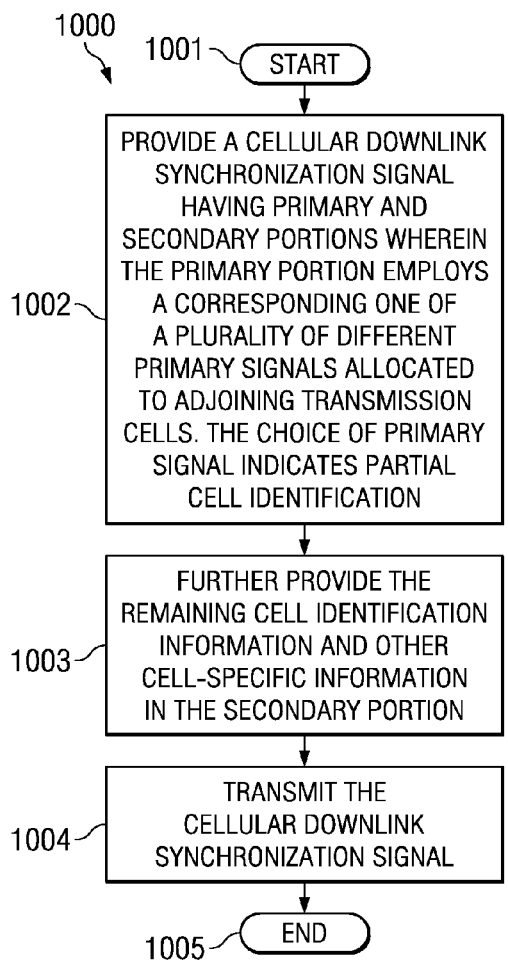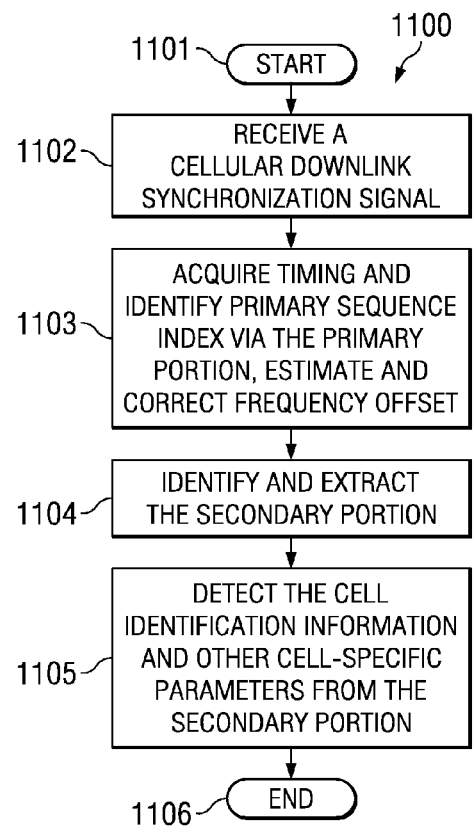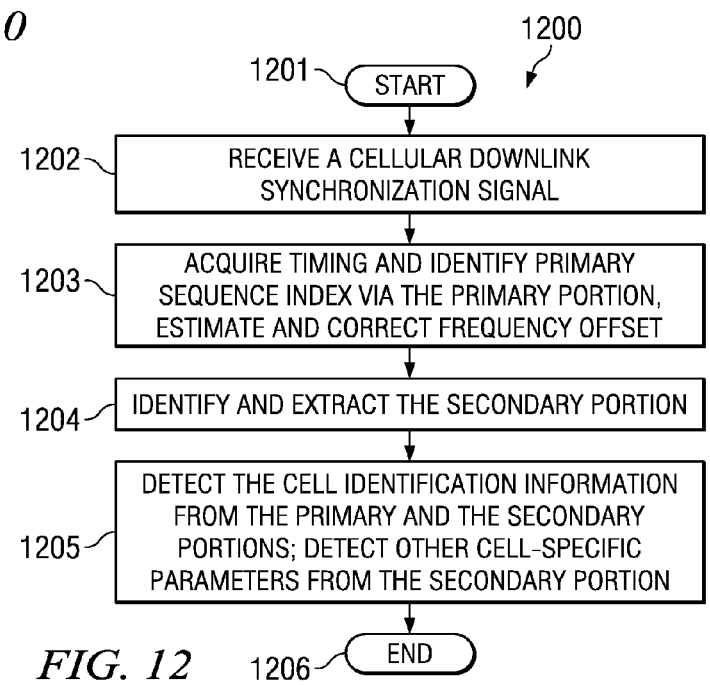
FIG. 10
FIG. 11
FIG. 12

DOWNLINK SYNCHRONIZATION CHANNEL AND METHODS FOR CELLULAR SYSTEMS

CROSS-REFERENCE TO PROVISIONAL APPLICATIONS

This application claims the benefit of U.S. Provisional Application No. 60/745,250 entitled "Downlink Synchronization Channel (SCH) Schemes for 3GPP LTE OFDMA" to Eko N. Onggosanusi and Anand G. Dabak, filed on Apr. 20, 2006, which is incorporated herein by reference in its entirety.

This application also claims the benefit of U.S. Provisional Application No. 60/828,846 entitled "Proposal for DL SYNC Channel (SCH) for E-UTRA Cell Search" to Eko N. Onggosanusi, filed on Oct. 10, 2006, which is incorporated herein by reference in its entirety.

Additionally, this application claims the benefit of U.S. Provisional Application No. 60/884,557 entitled "Multi P-SCH Design with Hybrid Code-Time Domain Approach" to Eko N. Onggosanusi, Anand G. Dabak and Badri N. Varadarajan, filed on Jan. 11, 2007, which is incorporated herein by reference in its entirety.

Further, this application claims the benefit of U.S. Provisional Application No. 60/891,067 entitled "Refinement of Multi-PSC Scheme for 3GPP LTE OFDMA" to Eko N. Onggosanusi, Anand G. Dabak, and Badri N. Varadarajan, filed on Feb. 22, 2007, which is incorporated herein by reference in its entirety.

TECHNICAL FIELD OF THE INVENTION

The present invention is directed, in general, to wireless communications and, more specifically, to transmitters and a receiver, methods of operating a transmitter and a receiver and a cellular communication system employing the transmitters, the receiver and the methods.

BACKGROUND OF THE INVENTION

In a cellular network, such as one employing orthogonal frequency division multiplexing (OFDM) or orthogonal frequency division multiple access (OFDMA), each cell employs a base station that communicates with user equipment, such as a cell phone, a laptop, or a PDA, that is actively located within its cell. When the user equipment is first turned on, it has to do an initial cell search in order to be connected to the cellular network. This involves a downlink synchronization process between the base station and the user equipment wherein the base station sends a synchronization signal to the user equipment. The synchronization signal is typically known as the synchronization preamble in the IEEE 802.16e or synchronization channel (SCH) in the 3GPP WCDMA/HSDPA.

During initial cell search, the user equipment establishes timing and frequency offset parameters. Timing involves knowing where to sample the start of the synchronization frame and associated symbols. Frequency offset involves determining the mismatch between the controlling oscillator at the base station and the local oscillator in the user equipment.

Depending on the quality of the local oscillator, the frequency offset may be large and require considerable search time as well as additional algorithms to accommodate. This effect is exacerbated if the user equipment is moving at car or train speeds. In addition to timing and frequency considerations, some information that is specific to the initial cell, such as physical cell identification (Cell ID), has to be acquired. Since downlink synchronization involves several operations, the design and procedure of downlink synchronization shall attempt to minimize the receiver complexity and time required for cell search. To aid the complexity reduction, the synchronization signal may consist of two portions: the primary and secondary synchronization signals. The primary signal is typically used for timing and frequency acquisition whereas the secondary signal is typically used to acquire the Cell ID and other cell-specific information. Unlike the secondary signal, the primary signal is typically common to all cells. The primary synchronization signal carries the primary synchronization sequence. To ensure competitive performance, the primary synchronization signal is used to obtain the channel estimates necessary for decoding the cell-specific information in the secondary signal via coherent detection.

As the moving user equipment approaches a cell boundary between two adjoining cells, it performs a neighboring cell search in preparation to handover its activation from the initial cell to the neighboring cell. During this time, it receives information from two or more base stations. When the base stations employ a common primary sequence, this common signal causes a mismatch between the channel experienced by the cell-specific transmissions and the transmitted primary signal for the user equipment. This mismatch is severe especially for terminals at the cell edges where each of the terminals receives two equally strong and overlapping channels from two significant base stations. Another problem associated with a common primary synchronization sequence is the timing mismatch between the channel experienced by the primary sequence and the cell-specific data transmission. In this case, the timing obtained from the primary sequence may result in performance degradation when used to demodulate a cell-specific data transmission. This phenomenon occurs especially in a tightly synchronized network, such as those deployed in the USA and Japan, and has become increasingly popular with medium to large cell radius. In addition, advanced cellular OFDM systems such as the 3GPP E-UTRA (enhanced UMTS Terrestrial Radio Access) or Long-term Evolution (LTE) accommodate the use of single frequency network (SFN) for the enhanced multimedia broadcast and multicast systems (E-MBMS) which heavily relies upon network synchronization. While this phenomenon is also relevant to the initial cell search, it is particularly problematic for the neighboring cell search as the operating signal-to-noise ratio (SNR) for the neighboring cell search is considerably lower. This performance reduction translates to larger cell search time, which may result in higher disconnect probability upon handover.

Accordingly, what is needed in the art is an enhanced way to accomplish initial and neighboring cell searches.

SUMMARY OF THE INVENTION

To address the above-discussed deficiencies of the prior art, the present invention provides a base station transmitter for use with an OFDM or OFDMA communication system. The base station transmitter includes a synchronization unit configured to provide a cellular downlink synchronization signal having primary and secondary portions wherein the primary portion employs a corresponding one of a plurality of different primary synchronization signals (or primary synchronization sequences) allocated to different transmission cells and the secondary portion provides cell-specific information. The base station transmitter also includes a transmit unit configured to transmit the cellular downlink synchronization signal. In one embodiment, the set of primary synchronization codes are utilized to represent partial Cell ID information thereby reducing the amount of Cell ID information that needs to be carried by the secondary portion. In another embodiment, the set of primary synchronization codes do not carry any Cell ID information.

The present invention also provides a user equipment receiver for use with an OFDM or OFDMA communication system. In one embodiment, the user equipment receiver includes a receive unit configured to receive a cellular downlink synchronization signal having primary and secondary portions wherein the secondary portion provides cell-specific parameters. Additionally, the user equipment receiver also includes a processing unit configured to identify and extract the secondary portion.

In another embodiment, the method includes providing a cellular downlink synchronization signal having primary and secondary portions wherein the primary portion employs a corresponding one of a plurality of different primary synchronization signals (or primary synchronization sequences) allocated to adjoining transmission cells. The method also includes further providing cell-specific information in the secondary portion and transmitting the cellular downlink synchronization signal.

The present invention also provides a method of operating a user equipment receiver for use with an OFDM or OFDMA communication system. The method includes receiving a cellular downlink synchronization signal having primary and secondary portions wherein the secondary portion provides cell-specific parameters and identifying and extracting the secondary portion.

The present invention also provides, in yet another aspect, a cellular communication system. The cellular communication system includes a manager that allocates a set of primary synchronization sequences to a plurality of cells and a centric cellular transmitter that provides a cellular downlink synchronization signal employing one of the primary synchronization sequences. The cellular communication system also includes a plurality of adjacent cellular transmitters that provide cellular downlink synchronization signals having corresponding primary synchronization sequences that are distinguishable from the one of the primary synchronization sequences.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 2 illustrates an exemplary primary synchronization sequence allocation for multiple cells (with 3 primary sequences) for cell sites containing 3 cells (sectors);

FIG. 3 illustrates an exemplary primary synchronization sequence allocation for multiple cells (with 7 primary sequences) for cell sites containing 3 cells (sectors);

FIG. 4 illustrates an exemplary primary synchronization sequence allocation for multiple cells (with 3 primary sequences) for cell sites containing 6 cells (sectors);

FIG. 5 illustrates the receiver operation for timing and primary synchronization signal detection assuming the use of 3 primary synchronization sequences;

FIG. 6 illustrates an exemplary 2-step cell search procedure utilizing multiple primary synchronization sequences;

FIG. 7 illustrates an exemplary time-domain method to increase the number of primary synchronization signal realizations by employing sub-frame-level shifts;

FIG. 9 illustrates a flow diagram of an embodiment of a method of operating a base station transmitter carried out in accordance with the principles of the present invention;

FIG. 10 illustrates a flow diagram of an alternative embodiment of a method of operating a base station transmitter carried out in accordance with the principles of the present invention;

FIG. 11 illustrates a flow diagram of an embodiment of a method of operating a user equipment receiver carried out in accordance with the principles of the present invention; and FIG. 12 illustrates a flow diagram of an alternative embodiment of a method of operating a user equipment receiver carried out in accordance with the principles of the present invention.

DETAILED DESCRIPTION

Figure 1:
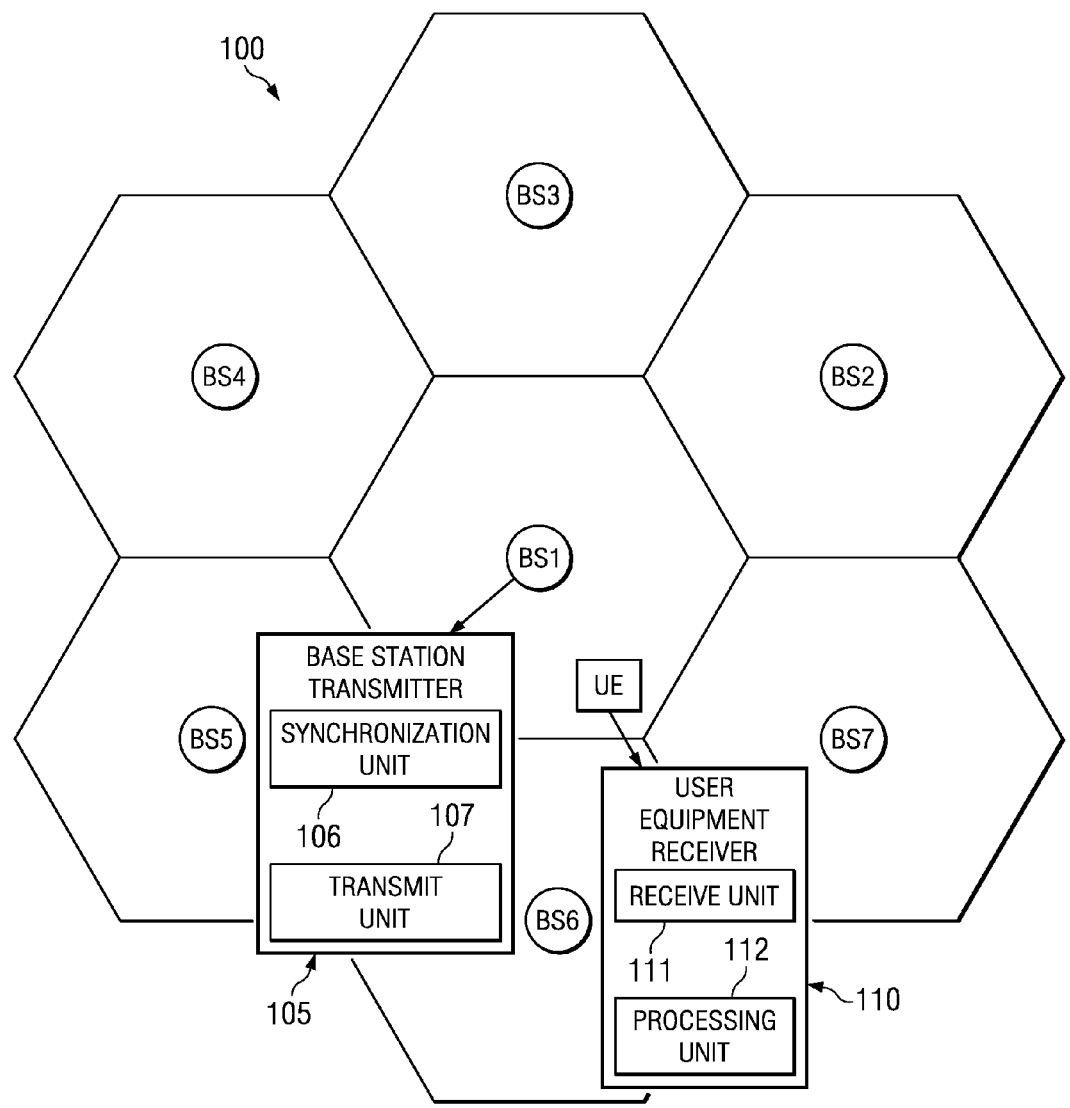
FIG. 1 illustrates a diagram of an embodiment of a cellular network constructed in accordance with the principles of the present invention.

Referring initially to FIG. 1, illustrated is a diagram of an embodiment of a cellular network, generally designated 100, constructed in accordance with the principles of the present invention. The cellular network 100 includes a cellular grid having a centric cellular site and six surrounding first-tier sites. The centric site employs one centric base station BS1 and the surrounding first-tier sites employ first tier base stations BS2-BS7, as shown. The cellular network 100 also includes user equipment UE, which is located in the centric site. Note that one cellular site may consist of one or multiple cells. A cell is often associated with a sector. Hence, we use the term "cell" and "sector" interchangeably. One "site" represents a collection of cells/sectors associated with the same base station.

The centric base station BS1 includes a base station transmitter 105 having a synchronization unit 106 and a transmit unit 107. In one embodiment, the synchronization unit 106 is configured to provide a cellular downlink synchronization signal having primary and secondary portions. The secondary portion provides information that is specific to the centric cell or site (i.e., "cell-specific"). The transmit unit 107 is configured to transmit the cellular downlink synchronization signal to the user equipment UE. The synchronization unit 106 is also configured to provide a cellular downlink synchronization signal having primary and secondary portions. The primary portion employs one of N (N>1) different primary synchronization signals (primary synchronization sequences), which are respectively allocated to the cells shown in FIG. 1. As before, the secondary portion provides information that is specific to the centric cell and the transmit unit 107 transmits the cellular downlink synchronization signal to the user equipment UE.

The user equipment UE includes a user equipment receiver 110 having a receive unit 111 and a processing unit 112. The receive unit 111 is configured to receive both the primary and secondary portions of the cellular downlink synchronization signal from the base station transmitter 105. The processing unit 112 is configured to identify and extract the secondary portion, which provides cell-specific parameters for the centric cell.

Providing the primary and secondary portions of the downlink synchronization signal allow timing and frequency offset issues to be resolved before cell-specific information is determined. This reduces complexity in initial cell search and handover modes for the user equipment UE. The cell-specific information may also include other parameters in addition to the Cell ID, such as the frame timing information and the antenna configuration indicator. The cell-specific information embedded in the secondary portion may be partial or full information. For example, the Cell ID related information may be the full physical Cell ID or a Cell ID group indicator. Another example is the exact number of base station transmit antennas or a 1-bit indicator whether the base station employs one or a plurality of transmit antennas. When only partial information is conveyed in the secondary portion, the full information shall be resolved using some other means. For example, the number of transmit antennas can be signaled in a broadcast channel that is demodulated by the user equipment after the completion of the cell search process. A partial indicator for the number of transmit antennas may also serve as the transmit diversity indicator for the broadcast channel.

One possible use of the N different primary synchronization sequences is to carry some partial cell-specific information such as the partial Cell ID. In this case, the network shall employ a fixed number of primary synchronization sequences (n=N). The physical Cell ID information is then partitioned into the primary and the secondary synchronization signals. Note that if the physical Cell ID is not fully encoded in the synchronization signal (both the primary and the secondary signals combined), the full Cell ID shall be acquired via some other means such as the cell-specific downlink pilot or reference signal. Obviously, if the physical Cell ID is fully encoded the synchronization signals, the full Cell ID can be acquired via the synchronization signals. That is, if there are M distinct Cell IDs partitioned into M/L groups of Cell IDs, the secondary synchronization signal indicates the Cell ID group (1 out of M/L possibilities), while the primary synchronization signal specifies the Cell ID within the Cell ID group (1 out of L possibilities). In this case, the downlink reference signal can be used to verify the acquired Cell ID.

Alternatively, the set of N different primary synchronization sequences can be used to simply avoid the mismatch between the channel experienced by the primary and the secondary synchronization signals whenever necessary. That is, the network is allowed to utilize variable number of primary synchronization sequences ($1 \leq n \leq N$). For example, in an asynchronous network, one cell-common primary synchronization sequence chosen from the set of N sequences can be used. In a tightly synchronized network, all or a subset of the N sequences can be used depending on the cell structure. In this case, the primary synchronization signal is not used to carry any cell-specific information such as the partial Cell ID although it may or may not be a function of the Cell ID. Hence, the secondary synchronization signal can either carry the full or partial Cell ID. If the secondary synchronization signal carries a partial Cell ID, means other than the synchronization signals shall be utilized to acquire the remaining Cell ID information. One example is the detection via the cell-specific downlink reference signal or pilot. Otherwise, the downlink reference signal can be used to verify the acquired Cell ID.

In either embodiment, primary synchronization sequence planning can be used to improve performance in synchronous networks. Such planning is instrumental since N should be small to minimize the terminal complexity increase as well as the potential degradation in timing estimation accuracy. The allocation of N primary synchronization sequences across cells may differ depending on how the physical Cell ID is partitioned between the primary and secondary synchronization signals. For the second embodiment, however, random allocation of the N primary sequences is not excluded.

An exemplary planning/assignment of N primary synchronization sequences for 3-sector hexagonal site is depicted in embodiment 201 of FIG. 2 with N=3. Here, each cell within the same site is assigned 1 out of the 3 available sequences in a 3-sector site. The pattern is then repeated across sites. This embodiment is particularly relevant when the primary synchronization signal carries a partial cell ID information with L=3 (3 Cell IDs within each Cell ID group). In particular, there is a 1-to-1 correspondence between the 3 Cell IDs within the Cell ID group conveyed in the secondary synchronization signal. While this embodiment reduces the load of secondary synchronization signal in carrying the Cell ID information, channel mismatch occurs on the sector boundaries within the same site. This is because the cell ID group information carried by the secondary synchronization signal is site-specific whereas the primary synchronization signal is cell-specific. Note, however, that the mismatch due to multi-path combining effect across base stations has been mitigated. In addition, this embodiment is relevant when the primary synchronization sequence/signal is associated with the Cell ID information conveyed by the secondary synchronization signal. This holds whether the primary synchronization signal is intended to carry a partial Cell ID information (in which case it is redundant) or not. The description in 201 of FIG. 2 shows only 3 cellular sites. This allocation pattern is repeated throughout the network as typical networks consist of a multitude of cellular sites.

Another exemplary planning/assignment of N primary synchronization sequences for 3-sector hexagonal site is depicted in embodiment 202 of FIG. 2 with N=3. This embodiment describes the use of site-specific primary synchronization sequence where the same sequence is used for different sectors within the same site. This is especially relevant when the primary synchronization signal is not intended to carry any Cell ID information and the secondary synchronization signal is site-specific (i.e. the Cell ID groups is site-specific) and the remaining Cell ID hypotheses shall be resolved via the cell-specific downlink reference signal or pilot. In this case, the multi-path channel seen by the primary and secondary synchronization signals are identical. The description in 202 of FIG. 2 shows only 3 cellular sites. This allocation pattern is repeated throughout the network as typical networks consist of a multitude of cellular sites.

An exemplary extension of the previous embodiment for N=7 is depicted in FIG. 3. While the channel mismatch due to multi-path combining across the first-tier sites for the primary synchronization signal can be avoided with N=3, multi-path combining across the second-tier sites take place. Multi-path combining across the first- and second-tier sites can be avoided with N=7. The description in FIG. 3 shows only 7 cellular sites. This allocation pattern is repeated throughout the network as typical networks consist of a multitude of cellular sites.

An exemplary planning/assignment of N primary synchronization sequences for 6-sector hexagonal site is depicted in FIG. 4 with N=3. In this case, the 3 primary synchronization sequences are simply allocated across sectors/cells to avoid any adjacent pair of cells associated with different base stations from using the same primary synchronization sequence. The description in 201 of FIG. 4 shows only 3 cellular sites. This allocation pattern is repeated throughout the network as typical networks consist of a multitude of cellular sites.

The above embodiments serve as examples of how multiple primary synchronization sequences can be used to facilitate faster cell search. Other variations are also possible for those skilled in the art.

The proposed solution suggests a receiver implementation depicted in FIG. 5, where the timing and primary sequence index are jointly detected. Here, "index" is simply a designation for the sequence (index n indicates the n-th primary sequence where n=1, 2, ..., N). That is, the received signal is correlated with each of the N candidate sequences (N=3 in FIG. 5 for illustrative purpose). Upon comparing the N correlation profiles, the peak indicates the correct timing as well as the primary synchronization sequence index. To reduce the receiver complexity, further optimization of the receiver operation is still possible. By exploiting the inherent structures of the sequences the correlation can be performed more efficiently. For example, when the sequences are binary-valued {+1,−1} in the time domain, only real additions are required. One may also performed sign-correlation where the received signal is correlated with the sign of the sequences. Furthermore, a subset of the N sequences may share some common terms or structures which can be exploited for further complexity reduction.

In relation to the primary sequence design, the N primary synchronization sequences can be defined in the time or frequency domains. While defining the sequences in the frequency domain may be more natural for OFDM/OFDMA-based systems, defining the sequences in the time domain may provide better correlation properties and receiver complexity reduction. Typically, the sequences are chosen to have good auto- and cross-correlation properties. Some examples are the class of constant amplitude zero auto-correlation (CAZAC) such as the Zadoff-Chu sequences, Golay sequences, and Walsh-Hadamard sequences.

An exemplary cell search procedure which utilizes multiple primary synchronization sequences is depicted in FIG. 6. It is assumed that the secondary synchronization signal carries the Cell ID group and the primary synchronization signal indicates the Cell ID within the group. The first step 601 utilizes the primary synchronization signal and consists of symbol timing and primary sequence index detection as described in the preceding paragraph. The primary sequence index corresponds to the Cell ID within Cell ID group. For initial cell search, the frequency offset is also estimated. Frequency offset estimation is not needed for neighboring cell search since the base stations within a network are typically frequency-synchronized. To determine if step 1 is successful, a test criterion is used. If step 1 is successful, the receiver proceeds to step 2. Otherwise, step 1 is repeated and averaging/accumulation over multiple instances can be used to improve the probability of success. The second step 602 utilizes the secondary synchronization signal and is intended to acquire the Cell ID group. In this example, the frame timing and transmit diversity indicator are also detected in the second step cell search. Note that depending on the exact structure and the type of information carried by the synchronization signals, the cell search procedure is different.

As mentioned above, the number of primary synchronization sequences should be kept minimum mainly to minimize the terminal complexity impact. However, it is generally desirable to increase the possible number of primary synchronization signal realizations as it offers planning and deployment flexibility to avoid the channel mismatch effect in synchronous network. To multiply the number of primary synchronization signal realizations, either frequency- or time-domain method can be used. The frequency-domain method assigns a portion of the synchronization signal bandwidth to a particular primary synchronization signal realization analogous to frequency reuse. This, however, also results in complexity increase. On the other hand, the time-domain method amounts to varying the locations of the primary synchronization signals within one radio frame across different cells. The different cells may be the cells within the same site (intra-site cells) or associated with different sites (inter-site cells). With N' different time shifts and N sequences, a total of N×N' synchronization signal realizations are available. A subset or all of those realizations can be used in the network. The time-domain method does not increase the terminal complexity as it is transparent to the terminal.

Figure 8:
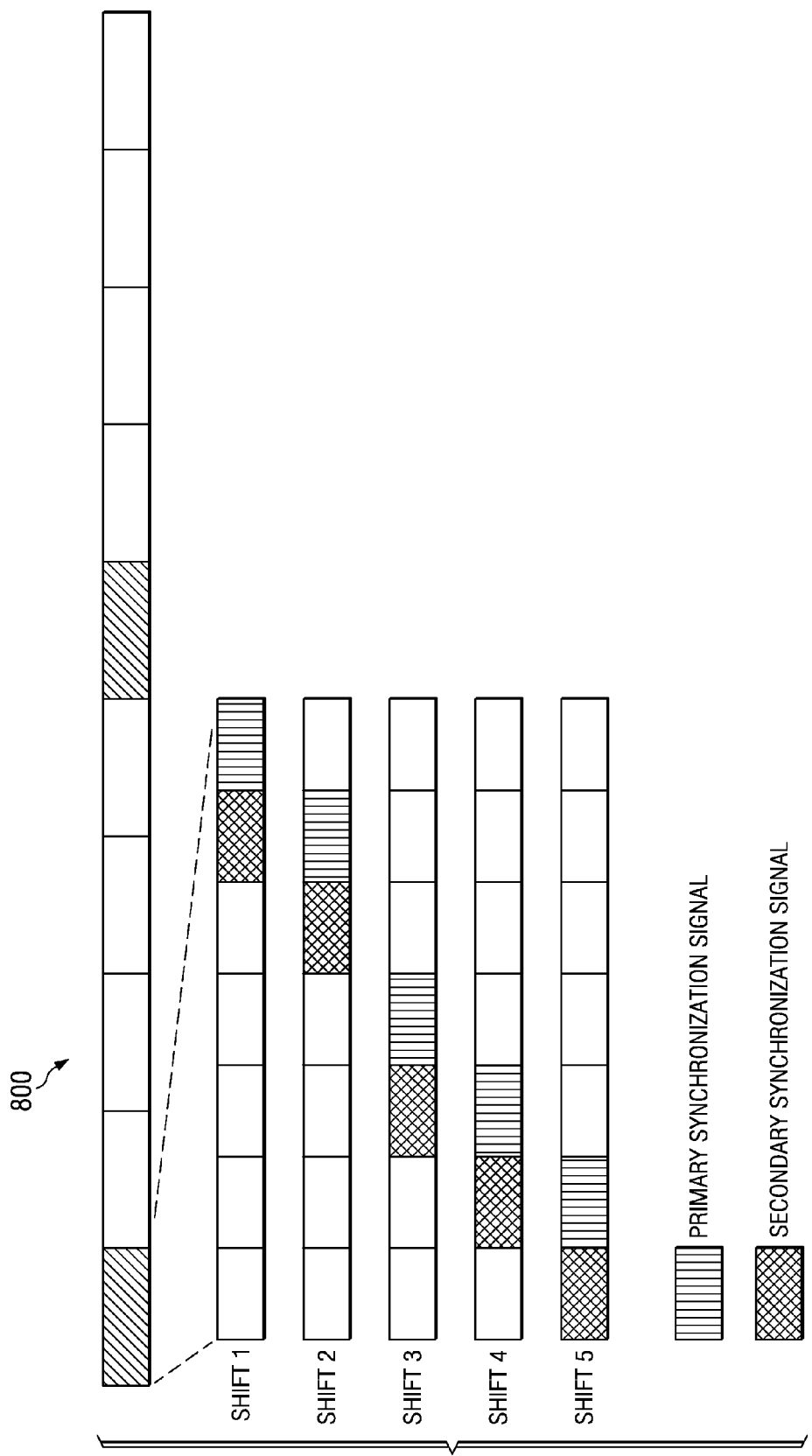
FIG. 8 illustrates an exemplary time-domain method to increase the number of primary synchronization signal realizations by employing symbol-level shifts.

In regard of the time-domain method, two different embodiments are possible. The first embodiment is depicted in FIG. 7 where the sub-frame-level shift is employed to increase the number of primary synchronization signal realizations. As an example, it is assumed that 1 radio frame consists of 10 sub-frames and 2 sub-frames are used to carry the synchronization signals. N'=2, 3, and 5 are shown. The second embodiment is illustrated in FIG. 8 where the symbol-level shift is employed to increase the number of primary synchronization signal realizations. In this case, the sub-frame which carries the synchronization signals is fixed but the location of the synchronization signals within the said sub-frame is varied. An exemplary scenario with a total of 5 shifts is given in FIG. 8 where the primary and secondary synchronization signals are adjacent to each other. Yet another possible embodiment is to apply circular shift of the primary synchronization sequences.

Referring now to FIG. 9, illustrated is a flow diagram of one embodiment of a method of operating a base station transmitter, generally designated 900, carried out in accordance with the principles of the present invention. The method 900 starts in a step 901. Then, in a step 902, a cellular downlink synchronization signal having primary and secondary portions is provided. The primary portion employs a corresponding one of a plurality of different primary synchronization signals allocated to adjoining transmission cells. Cell-specific information is further provided in the secondary portion in a step 903. The cell-specific parameters include at least cell identification information. Other cell-specific parameters may include the radio frame timing and antenna configuration indicator. The cellular downlink synchronization signal is transmitted in a step 904, and the method 900 ends in a step 905.

Referring now to FIG. 10, illustrated is a flow diagram of an alternate embodiment of a method of operating a base station transmitter, generally designated 1000, carried out in accordance with the principles of the present invention. The method 1000 starts in a step 1001. Then, in a step 1002, a cellular downlink synchronization signal having primary and secondary portions is provided. The primary portion employs a corresponding one of a plurality of different primary synchronization signals allocated to adjoining transmission cells. In addition, the choice of primary synchronization signal indicates a partial cell identification information. The remaining cell identification information is further provided in the secondary portion in a step 1003 along with some other cell-specific parameters such as radio frame timing and antenna configuration indicator. The cellular downlink synchronization signal is transmitted in a step 1004, and the method 1000 ends in a step 1005.

Referring now to FIG. 11, illustrated is a flow diagram of an embodiment of a method of operating a user equipment receiver, generally designated 1100, carried out in accordance with the principles of the present invention. The method 1100 starts in a step 1101, followed by a step 1102 where a cellular downlink synchronization signal having primary and secondary portions is received. The primary portion employs one of a plurality of different primary synchronization signals allocated to adjoining transmission cells. The primary portion of the cellular downlink synchronization signal is employed to perform timing acquisition and detect the index of the primary synchronization sequence in step 1103. In addition, frequency offset estimation and correction are also performed. Timing acquisition is performed by correlating the primary portion with a corresponding one of a plurality of replicas of the plurality of different primary synchronization signals. Once the timing and frequency locks are established in the step 1103, the secondary portion is identified and extracted in step 1104. The secondary portion is then employed to provide cell-specific parameters in a step 1105. Cell-specific parameters are determined by demodulating and decoding the secondary portion of the cellular downlink synchronization signal. The cell-specific parameters include at least cell identification information. The method 1100 ends in a step 1106.

Referring now to FIG. 12, illustrated is a flow diagram of another embodiment of a method of operating a user equipment receiver, generally designated 1200, carried out in accordance with the principles of the present invention. The steps 1201, 1202, 1203, 1204, and 1206 are identical to the counterparts in the embodiment 1100 given in FIG. 11. The only difference lies in step 1205 where the cell identification information is determined from both the primary and secondary portions. The partial cell identification information is obtained from the primary portion via the detected index of the primary synchronization sequence.

The methods disclosed in this invention are applicable for any cellular communication system employing any modulation or multiple-access technology such as OFDM/OFDMA, CDMA or TDMA. The solution also holds for any duplexing scheme such as frequency-division duplexing (FDD) and time-division duplexing (TDD).

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

Although the present invention has been described in detail, those skilled in the art should understand that they can make various changes, substitutions and alterations herein without departing from the spirit and scope of the invention in its broadest form.

What is claimed is:

1. A method of operating a base station transmitter, comprising:
   providing a downlink synchronization signal having primary and secondary portions wherein said primary portion employs a corresponding one of a plurality of different primary signals, wherein said plurality of different primary signals are associated with a plurality of different primary synchronization sequences and correspond to partial cell identification information and said secondary portion carries the remaining cell identification information;
   further providing cell-specific information in said secondary portion; and
   transmitting said cellular downlink synchronization signal.

2. The method as recited in claim 1 wherein the number of different primary signals is three.

3. The method as recited in claim 1 wherein the number of different primary signals is three.

4. The method as recited in claim 1 wherein the base station transmitter employs orthogonal frequency division multiplexing (OFDM).

5. A method of operating a base station transmitter, comprising:
   providing a downlink synchronization signal having primary and secondary portions wherein said primary portion employs a corresponding one of a plurality of different primary signals;
   further providing cell-specific information in said secondary portion, wherein said cell-specific parameters include at least cell identification information and radio frame timing indicator, wherein said plurality of different primary signals correspond to partial cell identification information and said secondary portion carries the remaining cell identification information; and
   transmitting said cellular downlink synchronization signal.

6. The method as recited in claim 5 wherein said cell-specific parameters also include an antenna configuration indicator.

7. The method as recited in claim 5 wherein the base station transmitter employs orthogonal frequency division multiplexing (OFDM).

8. A base station transmitter, comprising:
   a synchronization unit configured to provide a downlink synchronization signal having primary and secondary portions wherein said primary portion employs a corresponding one of a plurality of different primary signals, wherein said plurality of different primary signals are associated with plurality of different primary synchronization sequences information and correspond to partial cell identification information and said secondary portion carries the remaining cell identification information: and
   a transmit unit configured to transmit said cellular downlink synchronization signal.

9. The method as recited in claim 8 wherein the number of different primary signals is three.

10. The method as recited in claim 8 wherein the base station transmitter employs orthogonal frequency division multiplexing (OFDM).

11. A base station transmitter, comprising:
    a synchronization unit configured to provide a downlink synchronization signal having primary and secondary portions wherein said primary portion employs a corresponding one of a plurality of different primary signals and corresponds to partial cell identification information and said secondary portion carries the remaining cell-specific information, wherein said cell-specific information includes at least cell identification information and radio frame timing indicator; and
    a transmit unit configured to transmit said cellular downlink synchronization signal.

12. The transmitter as recited in claim 11 wherein said cell-specific parameters also include antenna configuration indicator.

13. The transmitter as recited in claim 11 wherein said plurality of different primary signals correspond to partial cell identification information and said secondary portion carries the remaining cell identification information.

14. The method as recited in claim 11 wherein the number of different primary signals is three.

15. The method as recited in claim 11 wherein the base station transmitter employs orthogonal frequency division multiplexing (OFDM).

16. A method of operating a user equipment receiver, comprising:
   receiving a cellular downlink synchronization signal having primary and secondary portions wherein said primary portion employs one of a plurality of different primary signals and said secondary portion provides cell-specific parameters;
   correlating said received signal with at least one of a plurality of waveforms corresponding to said plurality of different primary signals; and
   identifying and extracting said secondary portion.

17. The method as recited in claim 16 wherein said plurality of different primary signals are associated with plurality of different primary synchronization sequences.

18. The method as recited in claim 16 wherein cell-specific information is detected from said secondary portion.

19. The method as recited in claim 16 wherein the number of different primary signals is three.

20. The method as recited in claim 16 wherein cell identification is detected from said identified primary signal and said secondary portion of the downlink synchronization signal.

21. The method as recited in claim 20 wherein a cell-specific downlink reference signal is utilized for verifying the detected cell identification.

22. The method as recited in claim 16 wherein cell identification is detected only from said secondary portion.

23. The method as recited in claim 16 wherein cell identification is detected from said secondary portion and cell-specific downlink reference signal.

24. A user equipment receiver, comprising:
   a receive unit configured to receive a cellular downlink synchronization signal having primary and secondary portions wherein said primary portion employs one of a plurality of different primary signals and said secondary portion provides cell-specific parameters;
   a processing unit correlating said received signal with at least one of a plurality of waveforms corresponding to said plurality of different primary signals; and
   a processing unit configured to identify and extract said secondary portion.

25. The receiver as recited in claim 24 wherein said plurality of different primary signals are associated with plurality of different primary synchronization sequences.

26. The receiver as recited in claim 24 wherein cell-specific information is detected from said secondary portion.

27. The receiver as recited in claim 24 wherein the number of different primary signals is three.

28. The receiver as recited in claim 24 wherein cell identification is detected from said identified primary signal and said secondary portion of the downlink synchronization signal.

29. The receiver as recited in claim 24 wherein a cell-specific downlink reference signal is utilized for verifying the detected cell identification.

30. The receiver as recited in claim 24 wherein cell identification is detected only from said secondary portion.

31. The receiver as recited in claim 24 wherein cell identification is detected from said secondary portion and cell-specific downlink reference signal.

32. A method of operating a cellular communication network, comprising:
   allocating a set of distinguishable primary synchronization signals to a plurality of cells;
   assigning cell identification to the cells in the network;
   providing a downlink synchronization signal employing one of said primary synchronization signals to a centric cellular transmitter; and
   further providing downlink synchronization signals having corresponding primary synchronization signals that are distinguishable from said one of said primary synchronization signals to a plurality of adjacent cellular transmitters.

33. The method as recited in claim 32 wherein the number of distinguishable primary synchronization signals is three.

34. The method as recited in claim 32 wherein two contiguous cells are assigned different primary synchronization signals.

35. The method as recited in claim 32 wherein the cells within a single base station site are assigned a common primary synchronization signals and two adjacent sites are assigned different primary synchronization signals.

36. The method as recited in claim 32 wherein said primary synchronization signal allocated to each cell is associated with said cell identification.

37. The method as recited in claim 32 wherein said primary synchronization signal is assigned randomly across cells.

38. The method as recited in claim 32 wherein the cellular communication network employs orthogonal frequency division multiplexing (OFDM).

* * * * *

UNITED STATES PATENT AND TRADEMARK OFFICE
CERTIFICATE OF CORRECTION

PATENT NO. : 8,031,745 B2  Page 1 of 1
APPLICATION NO. : 11/737554
DATED : October 4, 2011
INVENTOR(S) : Onggosanusi et al.

It is certified that error appears in the above-identified patent and that said Letters Patent is hereby corrected as shown below:

In the Claims

Column 10, Claim 8, line 7, "with plurality" should be changed to -with a plurality-.
Column 10, Claim 8, line 8, "sequences information and" should be changed to -sequences and-.

Signed and Sealed this
Eighteenth Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,031,745 B2 | Page 1 of 1 |
| APPLICATION NO. | : 11/737554 | |
| DATED | : October 4, 2011 | |
| INVENTOR(S) | : Onggosanusi et al. | |

It is certified that error appears in the above-identified patent and that said Letters Patent is hereby corrected as shown below:

In the Claims

Column 10, Claim 8, line 44, "with plurality" should be changed to -with a plurality-.
Column 10, Claim 8, line 45, "sequences information and" should be changed to -sequences and-.

This certificate supersedes the Certificate of Correction issued March 18, 2014.

Signed and Sealed this
Fifteenth Day of April, 2014

Michelle K. Lee
*Deputy Director of the United States Patent and Trademark Office*